United States Patent
Suk

(10) Patent No.: US 7,199,982 B2
(45) Date of Patent: Apr. 3, 2007

(54) ELIMINATING ESD EXPOSURE FOR READ/WRITE HEAD WITH HEATING ELEMENT

(75) Inventor: Mike Suk, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 388 days.

(21) Appl. No.: 10/909,058

(22) Filed: Jul. 30, 2004

(65) Prior Publication Data

US 2006/0023367 A1    Feb. 2, 2006

(51) Int. Cl.
*G11B 5/56* (2006.01)

(52) U.S. Cl. .................................. 360/294.7

(58) Field of Classification Search .................. None
See application file for complete search history.

(56) References Cited

U.S. PATENT DOCUMENTS

| 6,920,020 | B2* | 7/2005 | Yamanaka et al. | 360/317 |
| 6,963,464 | B2* | 11/2005 | Xu et al. | 360/75 |
| 6,992,865 | B2* | 1/2006 | Thurn et al. | 360/294.7 |
| 7,006,336 | B2* | 2/2006 | Coffey et al. | 360/313 |
| 7,133,254 | B2* | 11/2006 | Hamann et al. | 360/126 |
| 2004/0240109 | A1* | 12/2004 | Hamann et al. | 360/126 |

* cited by examiner

*Primary Examiner*—A. J. Heinz
(74) *Attorney, Agent, or Firm*—Townsend and Townsend and Crew LLP; Mathew Zises

(57) ABSTRACT

Embodiments of the present invention provide a grounded conductive layer between the heater and the lower magnetoresistive (MR) shield in the read/write head structure. The grounded conductive layer eliminates or at least substantially prevents the accumulation of charges on the lower MR shield as a result of the voltage supplied to the heater. In one embodiment, a magnetic head comprises a plurality of read/write components; a heater disposed near the plurality of read/write components; and a grounded conductive layer disposed between the heater and the plurality of read/write components.

21 Claims, 3 Drawing Sheets

ELIMINATING ESD EXPOSURE FOR READ/WRITE HEAD WITH HEATING ELEMENT

CROSS-REFERENCES TO RELATED APPLICATIONS

NOT APPLICABLE

BACKGROUND OF THE INVENTION

This invention relates generally to recording systems and, more particularly, to eliminating ESD (electrostatic discharge) exposure for read/write heads with heating elements and tribocharging at the head/disk interface.

Current read/write heads with TFC (thermal flying-height control) technology utilizes a heater integrated near the read/write head structure to control the spacing between the read/write element and the magnetic recording disk. If a single ended power supply is used to power the heater, the mean voltage at the heater will not be zero. This may cause some charges to appear on the lower MR (magnetoresistive) shield of the MR read assembly of the head structure, which is exposed to the disk surface of the magnetic disk separated by the carbon overcoat and air. The presence of the charges may give rise to an ESD event between the lower MR shield and the disk surface or cause charging of the disk surface resulting in possible ESD events or other adverse consequences of tribocharging such as lube degradation.

BRIEF SUMMARY OF THE INVENTION

Embodiments of the present invention provide a grounded conductive layer between the heater and the lower MR shield in the read/write head structure. The grounded conductive layer eliminates or at least substantially prevents the accumulation of charges on the lower MR shield as a result of the voltage supplied to the heater.

In accordance with an aspect of the present invention, a magnetic head comprises a plurality of read/write components; a heater disposed near the plurality of read/write components; and a grounded conductive layer disposed between the heater and the plurality of read/write components.

In some embodiments, the grounded conductive layer is encapsulated in an insulating material and spaced between the heater and the plurality of read/write components, and the grounded conductive layer is not exposed on the side that faces the disk surface. The grounded conductive layer comprises of copper. The grounded conductive layer is at least as large in planar dimension as the heater to block influence of the heater on the read/write components. The grounded conductive layer has a thickness of about 50 to 200 nm.

In specific embodiments, the plurality of read/write components comprise a magnetoresistive read assembly having a first shield, a second shield, and a magnetoresistive sensing member disposed between the first shield and the second shield; and the grounded conductive layer is disposed between the heater and the first magnetic shield. The plurality of read/write components comprise a magnetoresistive read assembly having a first shield, a second shield, and a magnetoresistive sensing member disposed between the first shield and the second shield, which are exposed on the same side as the side with the air bearing surface of the magnetic head; and an inductive write assembly having a first pole piece and a second pole piece, which are exposed on the same side as the side with the air bearing surface. The heater is encapsulated in an insulating material and spaced from the plurality of read/write components, and the heater is not exposed on the same side as the side with the air bearing surface of the magnetic head. The heater has a ground end and the grounded conductive layer is connected to the ground end of the heater or it may be grounded through any other connection as long as it is grounded to the same power source of the heater. In a preferred embodiment, the ground plane will likely be larger than the heater in planar dimension to eliminate leakage through fringe fields.

In accordance with another aspect of the invention, a magnetic disk drive comprises a slider supported for movement relative to a magnetic disk; and a magnetic head attached to the slider and having an air bearing surface facing the magnetic disk. The magnetic head includes a plurality of magnetic head components for reading from or writing to the magnetic disk, a heater disposed near the plurality of magnetic head components, and a first grounded conductive layer disposed between the heater and the plurality of magnetic head components.

In some embodiments, a second grounded conductive layer is disposed between the heater and the slider. The second grounded conductive layer is encapsulated in an insulating material and spaced between the heater and the slider, and the second grounded conductive layer is not exposed on the same side as the side with the air bearing surface of the magnetic head. The second grounded conductive layer is at least as large in planar dimension as the heater to block influence of the heater on the slider. In a preferred embodiment, the ground plane will likely be larger than the heater in planar dimension to eliminate leakage through fringe fields.

In accordance with another aspect of the invention, a magnetic head comprises a magnetoresistive read assembly having a first shield, a second shield, and a magnetoresistive sensing member disposed between the first shield and the second shield, which are exposed on the same side as the side with the air bearing surface of the magnetic head; a heater disposed near the first shield of the magnetoresistive read assembly; and a grounded conductive layer disposed between the heater and the first shield of the magnetoresistive read assembly.

It is noted that the heater may be disposed at any location in the magnetic head structure, and the ground plane will be disposed between the heater and any part of the read/write structure that is near the heater. For example, the heater may be disposed next to the writing assembly in some embodiments. In that case, the ground plane will be located between the heater and the writing assembly.

DETAILED DESCRIPTION OF THE INVENTION

Figure 1:
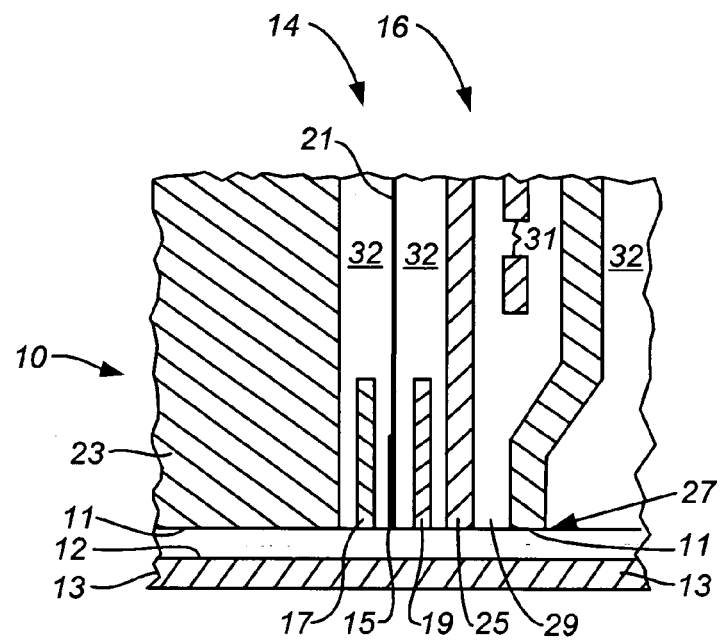
FIG. 1 is a cross-sectional view of a magnetoresistive (MR) head having an air bearing surface (ABS) disposed in facing relationship with a magnetic disk.
Figure 2:
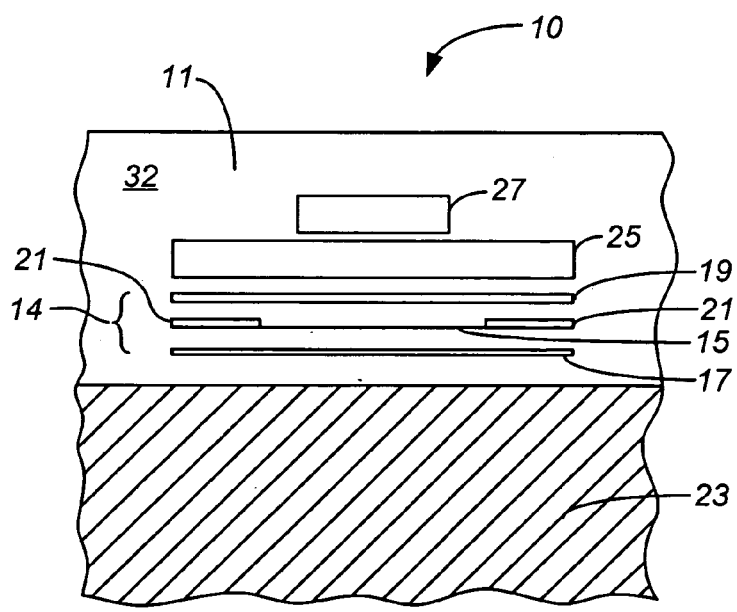
FIG. 2 is a plan view of the MR head of FIG. 1, viewed facing the ABS to illustrate the head read/write elements exposed thereon.

FIGS. 1 and 2 show a typical magnetoresistive (MR) read/inductive write magnetic head 10 in transducing relationship with a rotating magnetic recording disk 13 such that an air bearing surface (ABS) 11 is disposed in facing relationship with, and slightly above, a disk recording surface 12 of the recording disk 13. Typically, such a head 10 includes an MR read assembly 14 and an inductive write assembly 16 formed adjacent one another on a substrate 23. FIG. 2 is a plan view of the magnetic head 10 viewed facing the ABS 11, illustrating the magnetic head elements in the form of head read/write elements exposed on the same side as the side with the ABS 11.

The MR read assembly 14 includes an MR sensing element 15 fabricated of a ferromagnetic material, such as a nickel iron (NiFe) alloy, situated between the first or lower magnetic shield element 17 and the second or upper magnetic shield element 19. The MR sensing element 15 may include a single layer of NiFe, commonly referred to as Permalloy™; but more typically, the MR sensing element 15 includes a multilayer magnetic structure, including magnetic bias layers, of the type described in U.S. Pat. No. 4,785,366 or of the type described in U.S. Pat. No. 5,206,590, utilizing the giant MR effect. The shield elements 17, 19 may be fabricated of a highly permeable magnetic material, such as Permalloy™ described above or Sendust which is a trialloy of aluminum-silicon-iron. It is believed that the magnetic shield elements 17, 19 minimize or eliminate magnetic interference affecting the MR element 15, thereby eliminating extraneous electrical pulses, and improve the high frequency response. Electrically conductive leads 21, formed of copper (Cu) or other suitable conductive materials, are attached electrically at the end portions of the MR element 15 to couple the MR element 15 to external circuitry (not shown), and thereby provide a mechanism for sensing the electrical resistance of the MR element 15.

The MR read assembly 14 is fabricated by conventional semiconductor-type techniques such as vacuum deposition techniques using sputter deposition or the like on the substrate 23. During fabrication, the various elements of the MR head assembly are surrounded and insulated from each other by layers 32 of insulating or dielectric material, such as silicon dioxide or aluminum oxide (alumina).

The inductive write assembly 16 includes a lower or first pole piece 25 and an upper or second pole piece 27. The first and second pole pieces 25, 27 are made of a highly permeable magnetic material such as NiFe, and form a magnetic circuit magnetically connected together at a back portion (not shown). As a result, the first and second pole pieces 25 and 27 form a magnetic gap 29 at the air bearing surface 11. An inductive coil 31 is formed by one or more layers of an electrical conductor disposed between the first and second pole pieces 25, 27. The conductive layer or layers are typically made of electroplated copper. The inductive coil 31 is also connected to external circuitry via conductive leads (not shown). The pole pieces 25, 27 and inductive coil conductors 31 are fabricated by well-known processes such as electroplating or sputter deposition. The pole pieces 25, 27 are insulated electrically from the inductive coil 31 and the MR read assembly 14 by layers 32 of insulating material. Additionally, the entire assembly is covered with a capping layer of the insulating (and protective) or dielectric material 32.

As seen more clearly in FIG. 2, the MR read assembly 14 including magnetic shield elements 17, 19, the MR read element 15 and its lead conductors 21, and the inductive head 16 (including both inductive pole pieces 25, 27) terminate in or are exposed at the ABS 11. The magnetic head 10 shown in FIGS. 1 and 2 is sometimes referred to as a "piggyback" head. An alternative configuration for magnetic head 10 is referred to as a "merged" head (not shown) wherein the second MR magnetic shield element 19 is merged with the inductive write assembly first pole piece 25 to form a single element which performs the functions of both elements. In other words, in a merged head a single layer of NiFe, for example, situated between the MR head and the inductive coil functions as both the second shield and the first pole.

Figure 3:
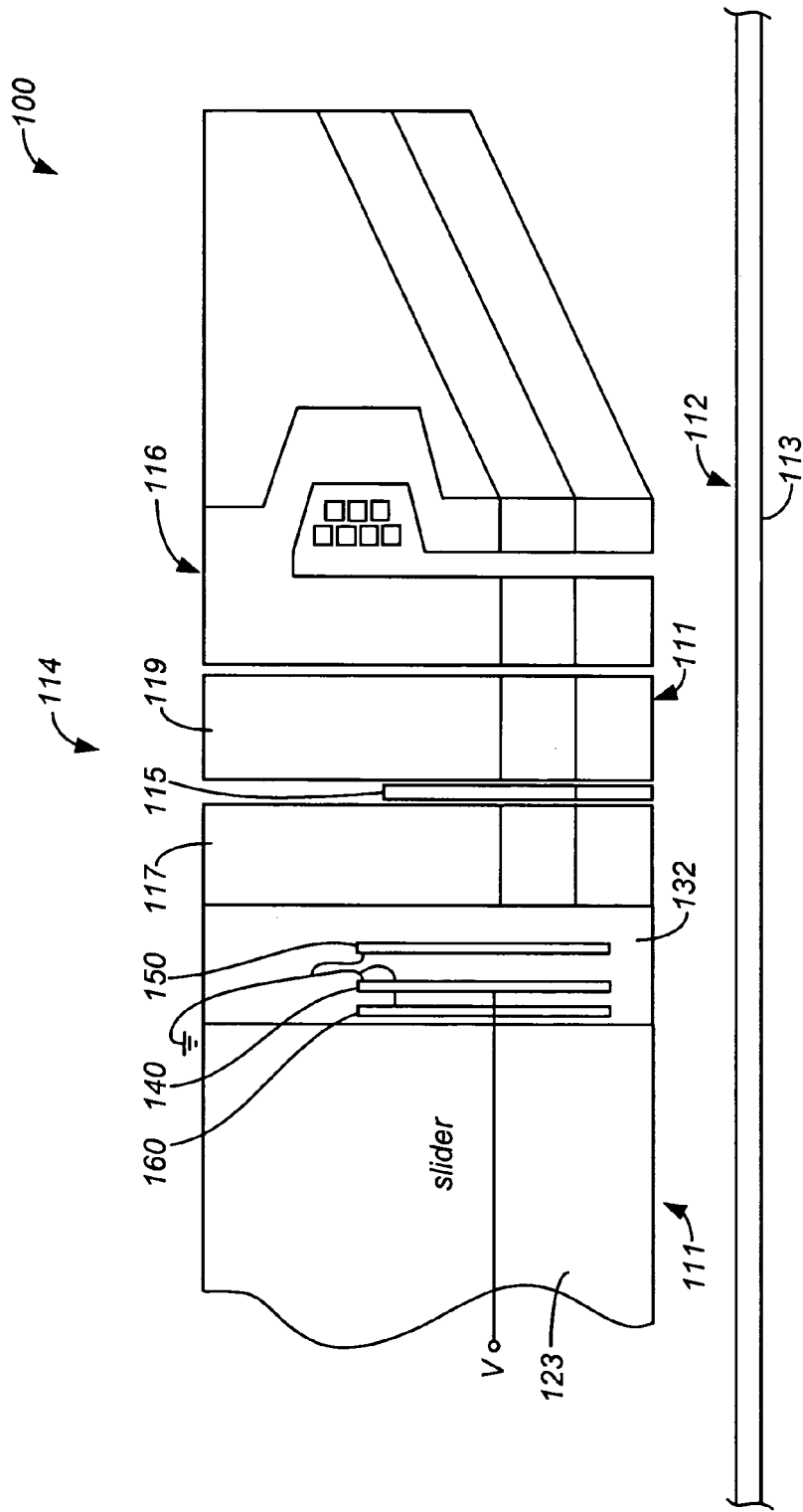
FIG. 3 is a cross-sectional view of an MR head having a heater and a grounded conductive layer according to an embodiment of the present invention.

FIG. 3 shows an MR magnetic head 100 including an integrated heater disposed near the read/write head structure. The air bearing surface (ABS) 111 of the MR magnetic head 100 faces the disk recording surface 112 of the rotating magnetic recording disk 113. The MR magnetic head 100 includes an MR read assembly 114 having an MR sensing element 115 disposed between the first or lower magnetic shield element 117 and the second or upper magnetic shield element 119; and a inductive write assembly 116 adjacent the MR read assembly 114. The MR read assembly 114 and inductive write assembly 116 are formed on the substrate 123. The substrate 123 is typically made from a sintered body of alumina and titanium carbide (hereinafter referred to as Al—TiC). The various elements of the MR head assembly are surrounded and insulated from each other by layers 132 of insulating or dielectric material, such as silicon dioxide or aluminum oxide (alumina). The substrate 123 is part of a slider that is equipped with the head 100 and floats on the recording surface 112 of the recording disk 113.

A heater 140 is disposed adjacent the lower shield 117 of the MR read assembly 114. More particularly, the heater 140 is encapsulated in the insulating or dielectric material 132 formed between the lower shield 117 and the substrate 123, and is not exposed on the same side as the side with the ABS 111. The heater 140 may be of a resistive coil that is powered electrically. FIG. 3 shows a voltage (V) applied to the heater 140 and a ground end for the heater line. If a single ended power supply is used to power the heater 140, the mean voltage at the heater will not be zero. This may cause some charges to appear on the lower shield 117, which is exposed to the disk surface 112 of the magnetic disk 113 separated by a carbon overcoat and air. The presence of the charges may give rise to an ESD event between the lower shield 117 and the disk surface 112 or cause charging of the disk surface 112 resulting in possible ESD events or other adverse consequences of tribocharging such as lube degradation.

To eliminate or minimize ESD exposure or other adverse effects, a grounded conductive layer 150 is disposed between the heater 140 and the lower shield 117 in the read/write head structure of the magnetic head 100. The grounded conductive layer 150 eliminates or at least substantially prevents the accumulation of charges on the lower MR shield 117 as a result of the voltage supplied to the heater 140. The grounded conductive layer 150 includes a conductive material such as copper, and may be formed by any suitable method, such as sputter deposition. The grounded conductive layer 150 is also encapsulated in the insulating material 132, and may be connected to the ground end of the heater 140 or to other ground lines. Alternatively, the grounded conductive layer 150 may be grounded through any other connection as long as it is grounded to the same power source of the heater 140. In the embodiment shown, the grounded conductive layer 150 is generally parallel to the heater 140, and is generally aligned with the heater 140 with respect to the lower MR shield 117. The grounded conductive layer 150 is at least as large or larger in planar dimension as the heater 140 to block the influence of the charged heater 140 on the lower shield 117. The grounded conductive layer 150 may be larger in planar dimension than the heater 140 and may have an outer edge of generally a similar shape as the heater 140, such as a rectangular shape. In a preferred embodiment, the grounded conductive layer 150 is larger than the heater 140 in planar dimension to eliminate potential leakage through fringe fields. The grounded conductive layer 150 typically has a thickness of about 50 to 200 nm, but is not limited to these dimensions.

It is noted that the heater may be disposed at any location in the magnetic head structure. The ground plane will be disposed between the heater and any part of the read/write structure that is near the heater. For example, the heater may be disposed next to the writing assembly, and the ground plane will be located between the heater and the writing assembly.

In FIG. 3, a second, optional grounded conductive layer 160 is formed between the heater 140 and the substrate 123 to preclude any charges from forming on the substrate 123 This prevents current flow from the slider, of which the substrate 123 is a part or to which the substrate 123 is connected, to the magnetic disk 113 in case the slider is not well grounded. The second grounded conductive layer 160 may have similar characteristics as the first grounded conductive layer 150 disposed between the heater 140 and the lower shield 117. For instance, the second grounded conductive layer 160 may be connected to the ground end of the heater 140 as shown in FIG. 3, and is at least as large or preferably larger in planar dimension as the heater 140 to block the influence of the charged heater 140 on the substrate 123.

Figure 4:
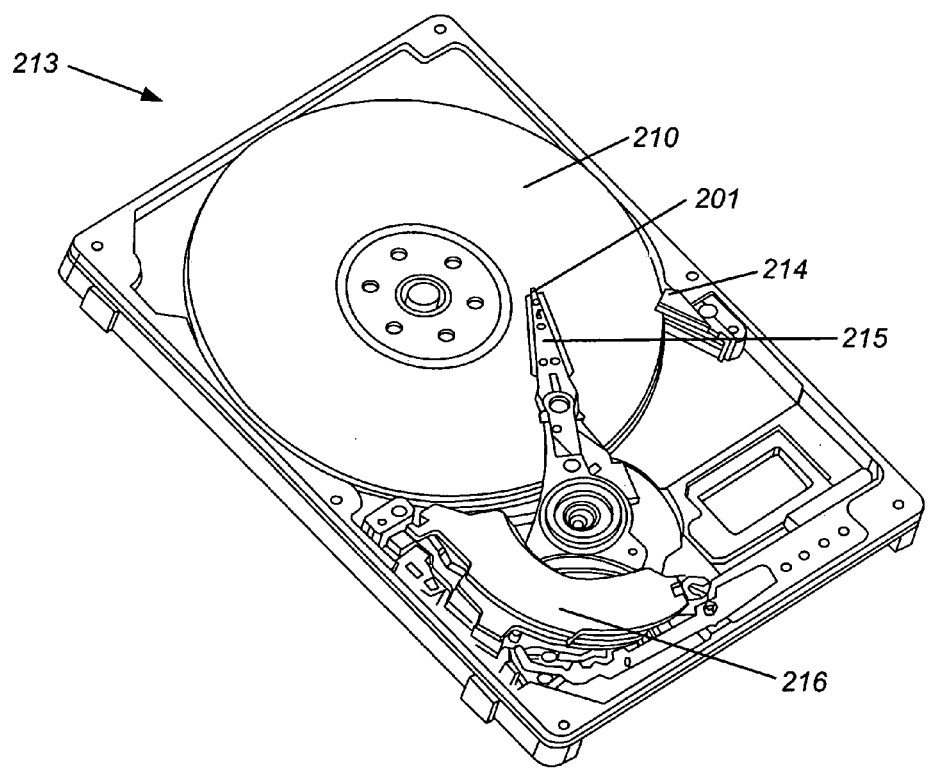
FIG. 4 is a perspective view of a magnetic disk drive using a magnetic head support mechanism on which a magnetic head slider of one embodiment of the invention is mounted.

FIG. 4 shows a magnetic disk drive 213 using a magnetic head support mechanism on which a magnetic head slider of one embodiment of the invention is mounted. The magnetic disk drive 213 includes a magnetic disk 210 and a slider 201. The magnetic disk 210 stores magnetic information and is rotated by a spindle motor. The slider 201 has a read/write device, such as the MR head 100 of FIG. 3, mounted thereon, and is supported by a magnetic head support mechanism (load beam) 215 having a suspension and positioned in a radial direction of the magnetic disk 210. The slider 201 reads and writes the magnetic information from and to the magnetic disk while flying relatively above the magnetic disk 210. The slider 201 serves as an air lubricant bearing and flies owing to an air wedge film effect, so that the slider does not come into contact with the magnetic disk. The slider 201 faces the rotating magnetic disk 210 to receive an air stream at a front end thereof. The rear end serves as an outflow facet of the slider 201.

In order to realize a high recording density of the magnetic disk drive 213 and thus the increased capacity or downsizing of the disk drive, it is desirable to increase the linear recording density by reducing the distance between the slider 201 and the magnetic disk 210, i.e., the slider flying height. In recent years, the slider flying height has been reduced to about 10 nm or less.

The slider 201 is attached to the plate spring-like magnetic head support mechanism (load beam) 215 having the suspension. The slider 201 receives a pressing load from the magnetic head support mechanism (load beam) toward a magnetic disk surface of the disk 210. The slider 201 together with the magnetic head support mechanism (load beam) 215 is allowed to seek in the radial direction of the magnetic disk 210 by a voice coil motor 216 to write and read information to and from the whole magnetic disk surface. The slider 201 retracts to a ramp 214 from the magnetic disk 10 while the disk drive is not in operation or in the absence of read/write command for a certain period of time. While the disk drive having the load/unload mechanism is described above, a similar effect is also achieved in a disk storage unit of the contact start/stop type wherein a slider waits at a specific region on a magnetic disk when the disk drive is not in operation.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
    a plurality of read/write components;
    a heater disposed near the plurality of read/write components; and
    a grounded conductive layer disposed between the heater and the plurality of read/write components.

2. The magnetic head of claim 1 wherein the grounded conductive layer is encapsulated in an insulating material and spaced between the heater and the plurality of read/write components, and wherein the grounded conductive layer is not exposed on the same side as the surface with the air bearing surface of the magnetic head.

3. The magnetic head of claim 1 wherein the grounded conductive layer comprises copper.

4. The magnetic head of claim 1 wherein the grounded conductive layer is at least as large in planar dimension as the heater to block influence of the heater on the read/write components.

5. The magnetic head of claim 1 wherein the grounded conductive layer has a thickness of about 50–200 nm.

6. The magnetic head of claim 1 wherein the plurality of read/write components comprise a magnetoresistive read assembly having a first shield, a second shield, and a magnetoresistive sensing member disposed between the first shield and the second shield; and wherein the grounded conductive layer is disposed between the heater and the first magnetic shield.

7. The magnetic head of claim 1 wherein the plurality of read/write components comprise:
    a magnetoresistive read assembly having a first shield, a second shield, and a magnetoresistive sensing member disposed between the first shield and the second shield, which are exposed on the same side as a surface with an air bearing surface of the magnetic head; and
    an inductive write assembly having a first pole piece and a second pole piece, which are exposed at the air bearing surface.

8. The magnetic head of claim 1 wherein the heater is encapsulated in an insulating material and spaced from the plurality of read/write components, and wherein the heater is not exposed on the same side as a surface with an air bearing surface of the magnetic head.

9. The magnetic head of claim 1 wherein the heater has a ground end and the grounded conductive layer is connected to the ground end of the heater.

10. A magnetic disk drive comprising:
    a slider supported for movement relative to a magnetic disk; and a magnetic head attached to the slider and having an air bearing surface facing the magnetic disk, the magnetic head including a plurality of magnetic head components for reading from or writing to the magnetic disk, a heater disposed near the plurality of magnetic head components, and a first grounded conductive layer disposed between the heater and the plurality of magnetic head components.

11. The magnetic disk drive of claim 10 wherein the first grounded conductive layer is encapsulated in an insulating material and spaced between the heater and the plurality of magnetic head components, and wherein the first grounded conductive layer is not exposed on the same side as a surface with the air bearing surface of the magnetic head.

12. The magnetic disk drive of claim 10 wherein the first grounded conductive layer is at least as large in planar dimension as the heater to block influence of the heater on the magnetic head components.

13. The magnetic disk drive of claim 10 wherein the plurality of magnetic head components comprise a magnetoresistive read assembly having a first shield, a second shield, and a magnetoresistive sensing member disposed between the first shield and the second shield; and wherein the first grounded conductive layer is disposed between the heater and the first magnetic shield.

14. The magnetic disk drive of claim 10 wherein the plurality of magnetic head components comprise:
a magnetoresistive read assembly having a first shield, a second shield, and a magnetoresistive sensing member disposed between the first shield and the second shield, which are exposed on the same side as a surface with the air bearing surface of the magnetic head; and
an inductive write assembly having a first pole piece and a second pole piece, which are exposed on the same side as the surface with the air bearing surface.

15. The magnetic disk drive of claim 10 wherein the heater is encapsulated in an insulating material and spaced from the plurality of magnetic head components, and wherein the heater is not exposed on the same side as a surface with the air bearing surface of the magnetic head.

16. The magnetic disk drive of claim 10 further comprising a second grounded conductive layer disposed between the heater and the slider.

17. The magnetic disk drive of claim 16 wherein the second grounded conductive layer is encapsulated in an insulating material and spaced between the heater and the slider, and wherein the second grounded conductive layer is not exposed on the same side as a surface with the air bearing surface of the magnetic head.

18. The magnetic disk drive of claim 16 wherein the second grounded conductive layer is at least as large in planar dimension as the heater to block influence of the heater on the slider.

19. A magnetic head comprising:
a magnetoresistive read assembly having a first shield, a second shield, and a magnetoresistive sensing member disposed between the first shield and the second shield, which are exposed on the same side as a surface with an air bearing surface of the magnetic head;
a heater disposed near the first shield of the magnetoresistive read assembly; and
a grounded conductive layer disposed between the heater and the first shield of the magnetoresistive read assembly.

20. The magnetic head of claim 19 wherein the grounded conductive layer is encapsulated in an insulating material and spaced between the heater and the first shield of the magnetoresistive read assembly, and wherein the grounded conductive layer is not exposed on the same side as a surface with the air bearing surface of the magnetic head.

21. The magnetic head of claim 19 wherein the grounded conductive layer is at least as large in planar dimension as the heater to block influence of the heater on the first shield of the magnetoresistive read assembly.

* * * * *